United States Patent [19]

Kidd

[11] Patent Number: 5,376,927
[45] Date of Patent: Dec. 27, 1994

[54] PROGRAMMABLE FLUID DETECTOR WITH PRESSURE PROBE DISCRIMINATOR

[75] Inventor: Roy E. Kidd, Clayton, Ind.

[73] Assignee: Emerson Electric Co., St. Louis, Mo.

[21] Appl. No.: 30,747

[22] Filed: Mar. 12, 1993

[51] Int. Cl.⁵ ............... G08B 19/00; G08B 21/00
[52] U.S. Cl. .................. 340/522; 340/521; 340/603; 340/605; 340/615; 340/514; 73/40; 73/40.7
[58] Field of Search .......... 340/522, 521, 603, 604, 340/605, 618, 620, 626, 614, 514; 73/61.43, 61.47, 40, 40.5 R, 40.2

[56] References Cited

U.S. PATENT DOCUMENTS

| | | | |
|---|---|---|---|
| 4,586,033 | 4/1986 | Andrejasich et al. | 340/603 |
| 4,644,354 | 2/1987 | Kidd | 73/49.2 |
| 4,721,950 | 1/1988 | Andrejasich et al. | 340/603 |
| 4,736,193 | 4/1988 | Slocum et al. | 340/522 |
| 4,740,777 | 4/1988 | Slocum et al. | 340/603 |
| 4,835,522 | 5/1989 | Andrejasich et al. | 340/521 |
| 4,835,717 | 5/1989 | Michel et al. | 364/558 |
| 4,855,714 | 8/1989 | Clarkson et al. | 340/521 |
| 4,876,530 | 10/1989 | Hill et al. | 340/605 |
| 5,086,403 | 2/1992 | Slocum et al. | 364/558 |

OTHER PUBLICATIONS

FD103 Electronic Programmable Fluid/Vapor Detection System–Oct. 1990.
Installation And Operation Instructions For Pollulert Control Center FD103–Mar. 1992.
E.P.A. Regulation 40 C.F.R. 280.40–280.45, Oct. 1992.

Primary Examiner—Donnie L. Crosland
Attorney, Agent, or Firm—Eric R. Waldkoetter

[57] ABSTRACT

A hydrocarbon leak detection system has a microprocessor based controller for receiving inputs from transducers and comparing the inputs against stored decision criteria to determine if hydrocarbons are leaking. The controller can receive and distinguish inputs from line pressure probes used for a product line tightness test, compare the line pressure probe inputs against stored decision criteria to determine status, and report the status.

3 Claims, 7 Drawing Sheets

| PROBE NUMBER | PROBE DATA | CONTROLLER DISPLAY | PRIOR ART | | IMPROVEMENTS | |
|---|---|---|---|---|---|---|
| | | | RS232 PRINTOUT | TEST STATUS | RS232 PRINTOUT | TEST STATUS |
| 12 | NO STATUS | | | | TEST | HAS NOT COMPLETED A TEST |
| 13 | OIL | OIL LEAK | OIL ALARM | FAILED GROSS OR CATOSTROPHIC LEAK TEST OR PRECISION TEST | OIL ALARM | FAILED GROSS OR CATOSTROPHIC LEAK TEST |
| 14 | DRY & OIL | WET ALERT | | | WET ALARM | FAILED PRECISION TEST |
| 15 | DRY | DRY | DRY | PROBE ACTIVE | PASS | PASSED ALL TESTS |
| *15 | IMPROPER SIGNATURE | ERROR | ERROR | PROBE NOT RESPONDING | ERROR | IMPROPER SIGNATURE PROBE OR PROBE INTERCONNECTION DEFECTIVE |

* PROBE NO. 15 LISTED TWICE TO SHOW FIFTH POSSIBLE STATUS WHEN AN ERROR IS DETECTED.

FIG. 7

PROGRAMMABLE FLUID DETECTOR WITH PRESSURE PROBE DISCRIMINATOR

BACKGROUND

This invention relates to a leak detection system programmable controller. More specifically, this invention is an improvement on U.S. Pat. Nos. 4,740,777 and 4,763,193 that are hereby incorporated by reference for a Programmable Fluid Detector.

U.S. Pat. Nos. 4,740,777 and 4,763,193 are directed to an electronic, microprocessor based, programmable hydrocarbon leak detection system controller (hereinafter controller) of the type typically used in vehicle service stations that dispense fuel. The controller is connected to various transducers or probes such as those that work on the principals of conduction to differentiate between water and hydrocarbon, probes that work on the principal of absorption to detect vapors, and pressure probes that work on the principal of pressure changes. These probes determine if liquid hydrocarbons are leaking from hydrocarbon tanks and lines. When the controller was designed, dispensing lines had line pressure probes, but the controller only annunciated when a gross or catastrophic leak occurred. The controller did not have the capability to indicate the line pressure probe had performed a line tightness test also known as a precision test.

Starting in 1990, the Environmental Protection Agency (E.P.A.) began requiring either an annual line tightness test or a monthly line tightness test with a required detection rate of "0.2 gallon [0.757 liters] per hour leak rate or a release of 150 gallons [567.81 liters] within a month with a probability of detection of 0.95 and a probability of false alarm of 0.05." 40 C.F.R. § 280.43 (h) (1) (1988).

The monthly line tightness test could be performed but required that product dispensing be halted during the test and experienced problems with false alarms, and lacked a positive output that the line tightness test was successful Since the leak detection controller was not designed to process or report dispensing line pressure and status, the controller's software Error Check Routine as described in U.S. Pat. Nos. 4,740,777 and 4,835,717 was originally only programmed to respond to the statuses of oil, dry, or wet. If multiple statuses or no status was received by the controller from any probe, the controller would indicate an error condition. Therefore, for the leak detection controller to respond to a line pressure probe, without changing hardware, the pressure would have to report some combination of oil and dry rather than pressures.

What is needed is a software program improvement that will allow the controller to perform a monthly line tightness test with the a line pressure probes that reports the statuses of oil, dry, oil and dry, or no status. Additionally, a program modification is needed that will permit the controller to visually display the results of the line tightness test.

SUMMARY

The present invention is directed to an apparatus and method that satisfies the need for a leak detection controller to perform a line tightness test.

I have invented a method and apparatus for a leak detection controller to discriminate between line pressure probe signals to report the status of a line tightness test. A programmable fluid detector with pressure probe discriminator having features of the present invention comprises the following. A programmable fluid detector which receives input signals for a plurality of probes, identifies each probe and associating input signals with the probes that produced the input signal, compares input signals against stored decision criteria, and reports the result of the comparison.

The programmable fluid detector also includes a line pressure probe for generating input signals to be received by the controller responsive to the pressure of fluids in a product dispensing line remote from the controller, the input signals are communicated to the controller on wires that interconnect the pressure probe with the controller. The programmable fluid detector further compares input signals against stored decision criteria wherein previously used and previously unused line pressure probe signals are assigned meanings to positively report passing or failing a line tightness test.

The method for a leak detection controller to separate line tightness test signals from other pressure test signals contains the following steps. A controller is provided which is programmable and receives input signals from a plurality of probes and compares theses input signals against stored decision criteria and reports the result of the comparison. A line pressure probe is provided for generating input signals to be received by the controller. The controller determines whether an input signal is from a line pressure probe. The controller also determines whether the line pressure probe is functioning correctly. The controller reads the line pressure probe data, and reports the line pressure probe data to indicate either a line tightness test has been passed or failed.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE DRAWINGS

Figure 1:
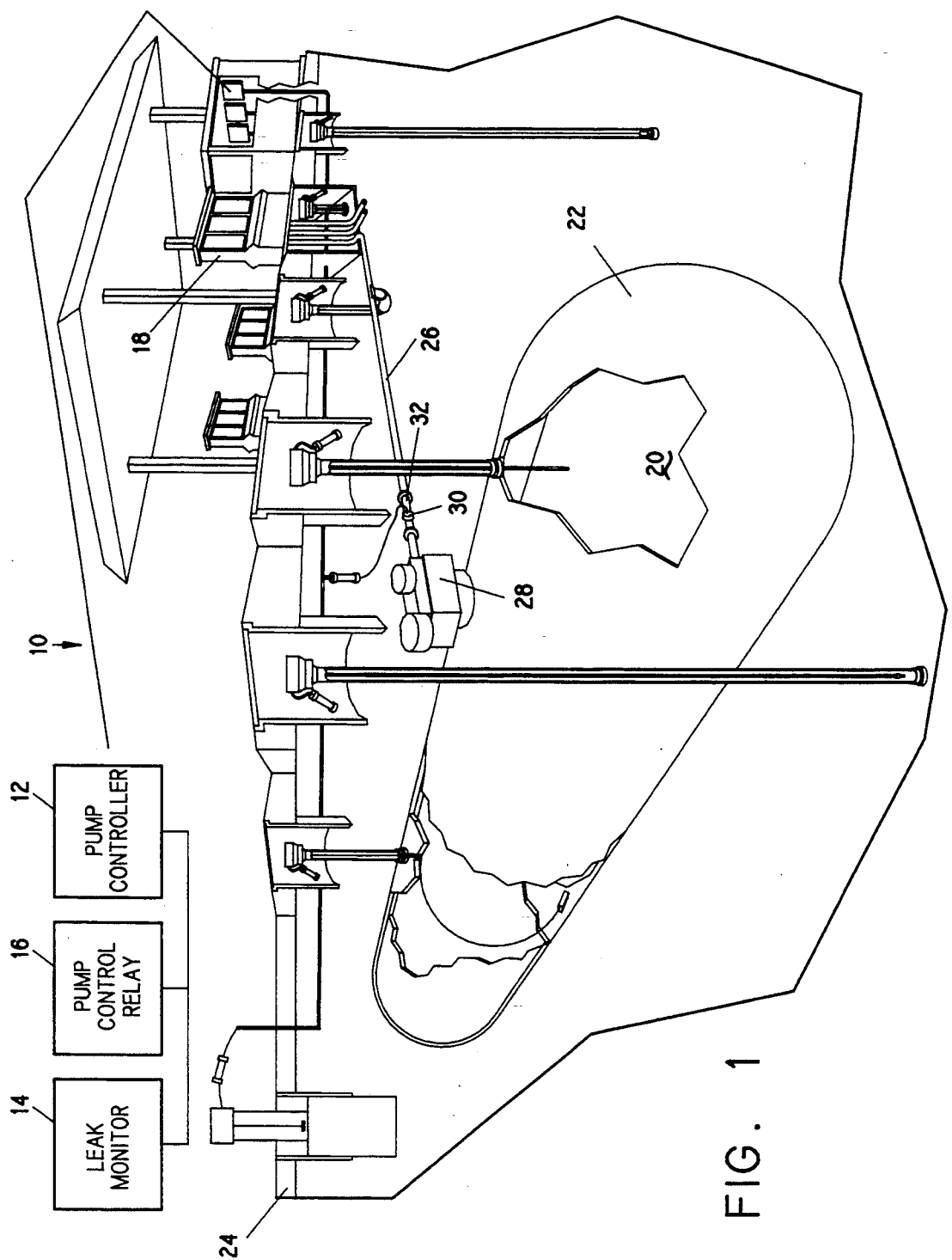
FIG. 1 shows an installed leak detection system.

The pump controller 12 is a component of a hydrocarbon leak detection system 10 such as shown in FIG. 1. The pump controller 12 is connected to a leak detection 14, a pump controller relay 16, and a dispenser 18.

Figure 2:
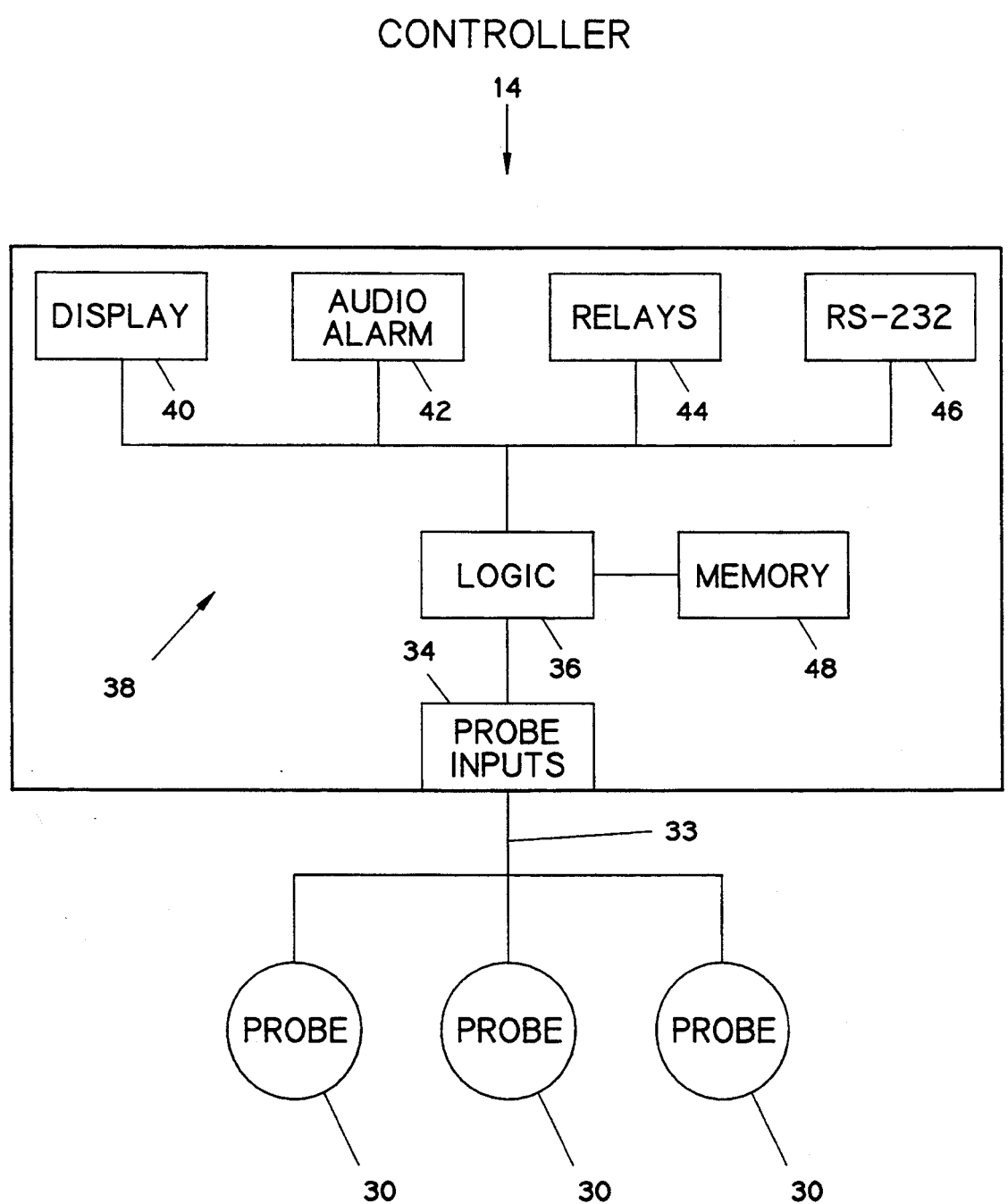
FIG. 2 shows a block diagram of a controller.

Referring to FIGS. 1 and 2, an overview of a typical hydrocarbon leak detection system 10 of the type commonly found in fuel service stations is described. The fuel 20 is stored in a underground storage tank 22 which is typically buried beneath a concrete slab 24. A product line 26 extends from the underground tank 22 to a dispenser 18 which is mounted on the slab 24. A submersible pump 28, such as a Red Jacket ® Electronics petroleum pump part no. P75S1 available from The Marley Pump Co., 5800 Foxridge Dr., 66202, P.O. Box 2973, Mission, Kans. 66202. The pump 28 is operated by a pump controller relay 16, such as a Red Jacket ® Electronics pump controller relay part no. 880030, to pump the fuel 20 through the product line 26 to the dispenser 18. A check valve (not shown) which is typically an internal component of the pump 28 prevents liquid from the product line 26 from draining back into the underground storage tank 22 when the pump 28 is turned "off".

Monitoring of pressure in a product line 26, such as a service station fuel dispensing pipe, can be accomplished with a pressure transducer or line pressure probe 30, such as that described in U.S. Pat. No. 4,835,717 which is hereby incorporated by reference, or Pollulert ® model no. FD202TDRA or FD203PSRA available from Pollulert ®, 2831 Waterfront Parkway East Drive, Indianapolis, Ind. 46214, is installed in a "T" connection 32 in the product line 26 for sensing product line pressure. The line pressure probe 30 is connected to the leak detection controller 14 with an address line 33 which comprises seven (7) wires. The line pressure probe 30 can provide an address signal over four (4) wires and a binary status signal over an additional three (3) wire data line (not shown) to the leak detection controller 14 to report product line 26 leak status. Although the line pressure probe 30 only uses two (2) wires to signal the controller 14. An eighth wire and associated shield wire (not shown) provide power to the line pressure probe 30.

Referring to FIG. 2, the microprocessor based leak detection controller 14 such as that described in U.S. Pat. Nos. 4,740,777 and 4,736,193 or a Pollulert ® model no. FD103, processes signals from line pressure probes 30 and other transducers in accordance with a computer program to determine and report the leak status of a fuel storage and distribution system (FIG. 1). More specifically the controller 14 receives input signals from a plurality of line pressure probes 30 and compares the input signals against stored decision criteria and reports the results of the comparison. The controller comprises the following: a means for receiving input signals from a plurality of probes 34, a means for identifying each probe and associating input signals with the probes that produced the input signal 36, a means for comparing input signals against stored decision criteria 36, and a means for reporting results of the comparison 38.

The controller means for identifying each line pressure probe 30 and associating input signals with the line pressure probes 30 that produced the input signal is accomplished by placing a four-bit address on the address line 33. The line pressure probe 30 with the same four-bit address will respond with its current status.

The controller means for receiving input signals from a plurality of line pressure probes 30 is accomplished by addressing each line pressure probe 30 individually and detecting each line pressure probe's 30 status signal.

The controller means for comparing input signals against stored decision criteria 36 such as programmed alarm condition is accomplished with a comparison in the controller 14 logic 36. The line pressure probe's input signal is composed of logic levels on three discrete wires (not shown) of the address line 33. Of the three discrete lines, one is dedicated to oil, one is dedicated to dry, and one is dedicated to wet.

The controller means for reporting results of the comparison 38 is accomplished with any or all of the following: a display 40, an audible alarm 42, relays 44, and an RS232 communications port 46. The means for reporting results of the comparison 38 reports any one of the following statuses: "test" when the line pressure probe input signal is no status; "wet" when the line pressure probe input signal is dry and oil; or, "pass" when the line pressure probe input signal is dry.

If the means for comparing input signals against stored decision criteria 36 determine that the signal received from a line pressure probe 30 equals a programmed alarm condition, the appropriate relays 44 will be triggered to annunciate an alarm. If the means for comparing input signals against stored decision criteria 36 determine that the signal received from a line pressure probe 30 does not equal a programmed alarm condition, the appropriate line pressure probe 30 status will be annunciated.

The line pressure probe 30 for generating input signals to be received by the controller responsive to the pressure of fluids in a product dispensing line 26 (FIG. 1) remote from the controller 14, the input signals are communicated to the controller 14 on address lines 33 that interconnect the line pressure probe 30 with the controller 14.

The means for comparing input signals against stored decision criteria, located in the controller 14 logic 36, wherein previously used and previously unused the line pressure probe 30 signals are assigned meanings to positively report passing or failing a line tightness test is accomplished by assigning any one or more of the following meanings: a no status input signal is processed by the controller to mean the line pressure probe has not completed a test; a dry input signal is processed by the controller to mean all line pressure probe test was passed; a dry and oil input signal is processed by the controller to mean the line pressure probe line tightness test was failed; an oil input signal is processed by the controller to mean the line pressure probe has failed either the catastrophic or gross tests; or, an improper input signal (signature) is processed by the controller to mean the line pressure probe or the connection between the line pressure probe and the controller is defective.

Overview of the software improvements. Since the controller 14 was not originally designed to read line pressure probe 30 data, the controller 14 Error Check Routine (FIG. 4), located in memory 48, was modified to first interpret probe addresses greater than or equal to twelve (12) as line pressure probe 30 addresses.

Also since the controller 14 was only designed to respond to the line pressure probe signals of oil and dry, the line pressure probes 30 would have to report some configuration of these two (2) signals to report line tightness test status. Since the controller 14 would recognize previously unused configurations of these signals as errors, the Error Check Routine (FIG. 4) was modified to process new configurations of these signals as line pressure probe 30 data.

Additionally, the controller 14 was not designed to report the results of a line tightness test, so the Process RS232 Routine (FIG. 6) has been changed to permit previously unused combinations of signals to report that a line tightness test is being run, a line tightness test has been passed, or that a line tightness test has failed.

Figure 3:
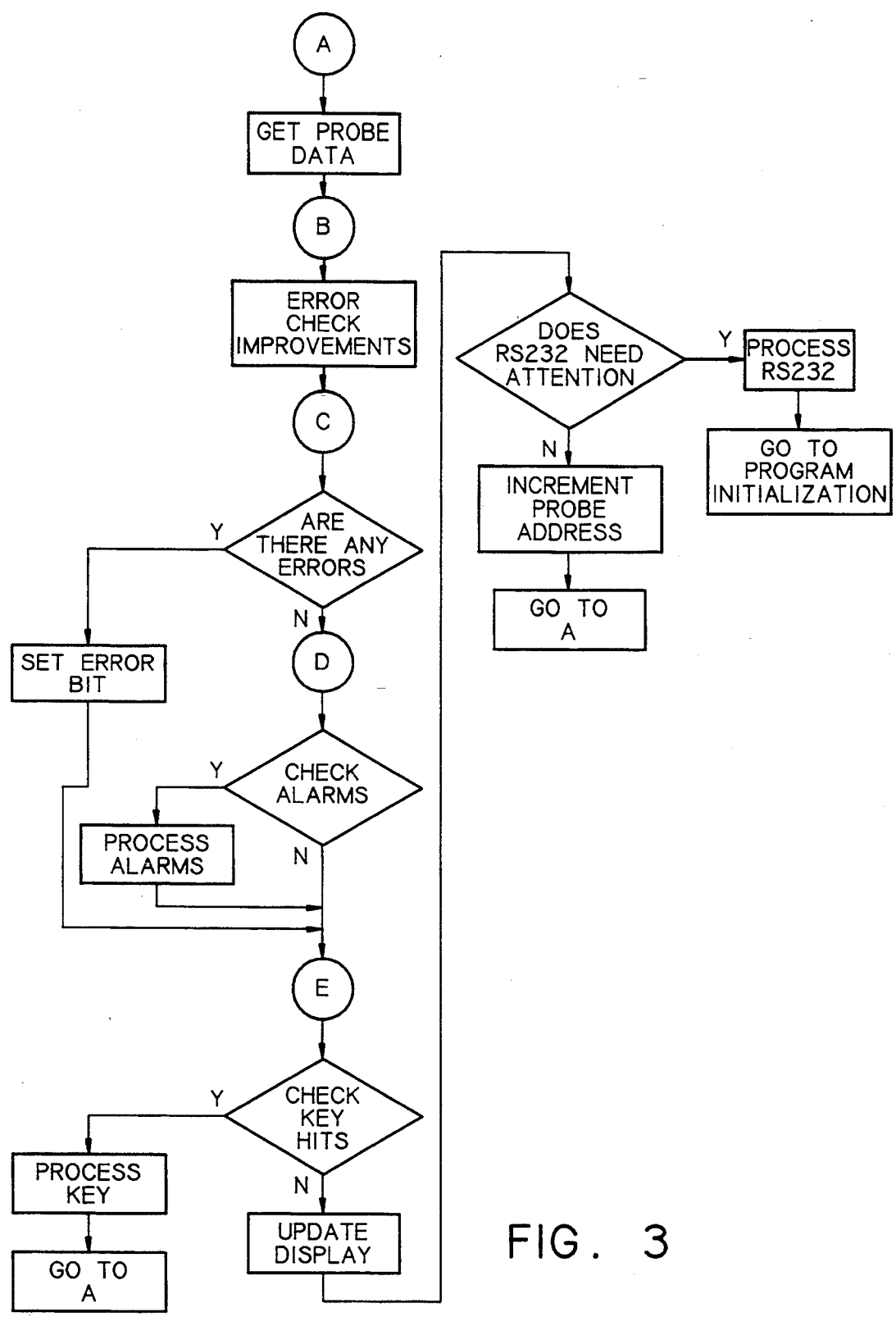
FIG. 3 shows a flowchart of the improvements.

Referring to FIG. 3, the system operates as follows. After initialization, the controller 14 gets data of the first probe. At label B, a determination is made whether the current probe address is assigned to a line pressure probe 30. If it is not a pressure probe address, execution is routed to label C. If it is a valid line pressure probe 30 address, the controller 14 then determines whether the line pressure probe 30 is functioning correctly by determining whether the line pressure probe 30 signature is proper.

If the line pressure probe 30 signature is incorrect then an error is reported to indicate that the line pressure probe 30 or interconnection with the controller 14 is defective and execution is routed to label C; otherwise, the controller 14 then performs data conversion as required and reenters at label D.

If the line pressure probe 30 signature is correct, line pressure probe 30 data is tested to determine if any programmed alarm conditions exist. Existing alarms are processed. The controller 14 then tests to determine if any keys on the keyboard have been depressed. If keys have been depressed, the keys are processed and execution returns to label A.

If keys have not been depressed, then the keyboard does not require attention, and the display is updated. Next, the RS232 input is tested to determine if it requires attention. If the RS232 does not require attention, then the probe address is incremented and control returns to label A. If the RS232 requires attention, then the request is processed and a warm reset is preformed. The warm reset completely reinitializes the system.

Figure 4:
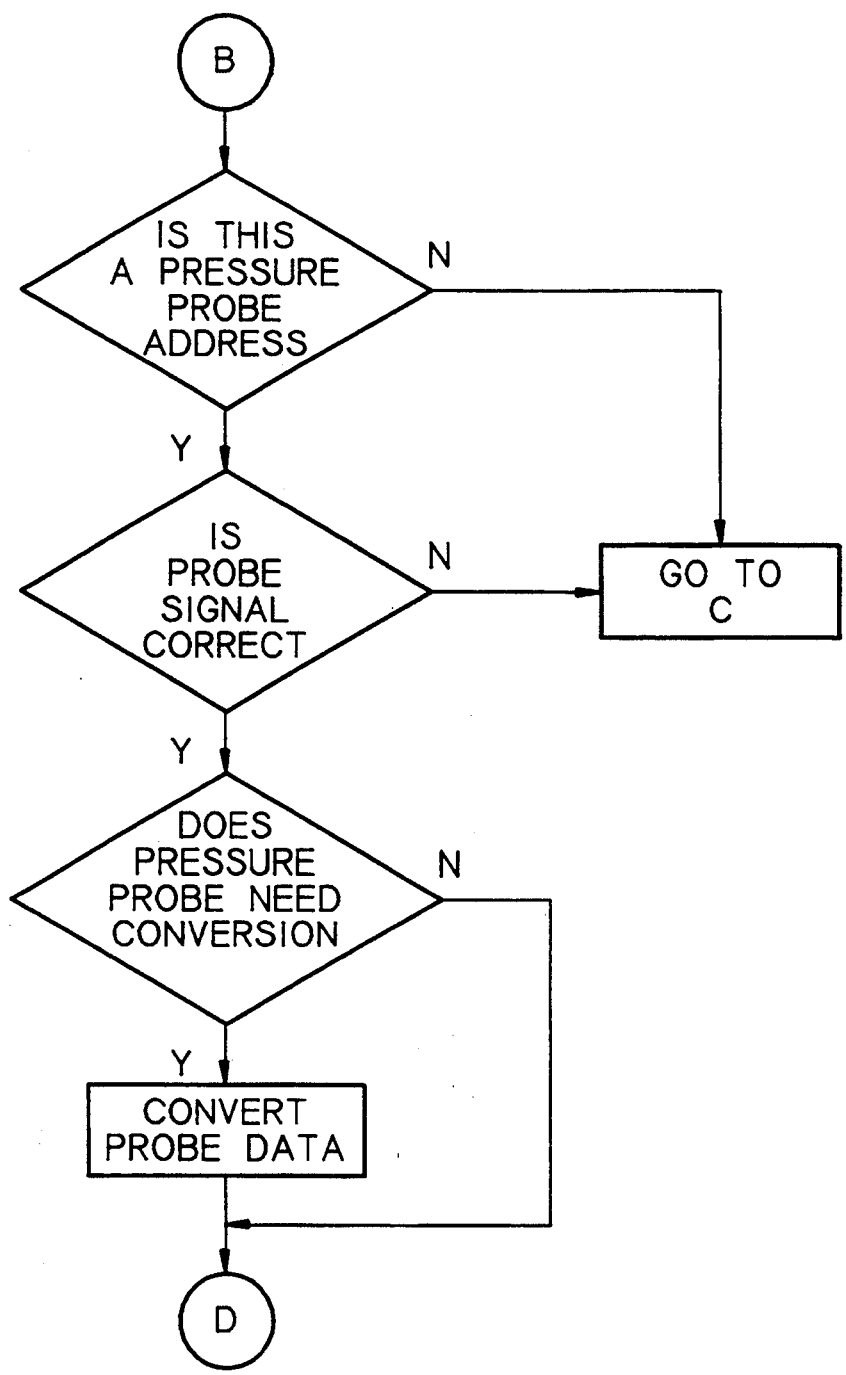
FIG. 4 shows a flowchart of probe signature and error detection improvements.

Detailed discussion of the software improvements. Referring to FIG. 4, an overview of the Error Check Routine is shown. Beginning at label B, a determination is made whether the current probe address is a line pressure probe 30 address. If current address is not a line pressure probe 30 address, the program flow is directed to label C in FIG. 3. If the current address is a line pressure probe 30 address, the line pressure probe 30 signature is tested to determine if the line pressure probe 30 is operating correctly. If the line pressure probe 30 signature is incorrect, program flow is routed to label C FIG. 2. If the line pressure probe 30 signature is correct data conversion is preformed as required.

Figure 5:
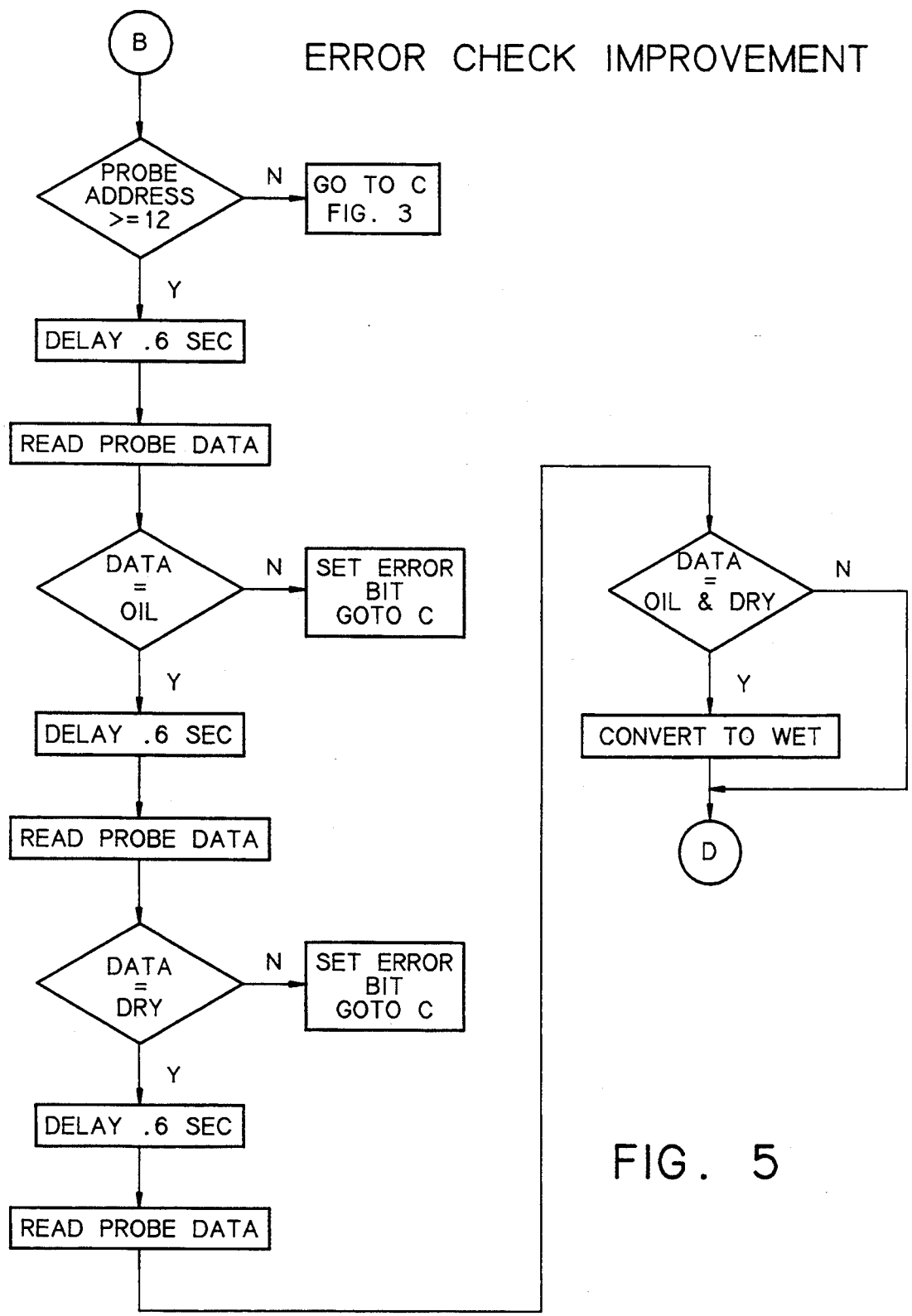
FIG. 5 shows a more detailed flowchart of probe signature and error detection improvements.

Referring to FIG. 5, a detailed view of the Error Check Routine is shown. Beginning at label B, the probe address is tested to determine if the probe address is a line pressure probe 30 address, i.e., whether the probe address is greater than or equal to twelve (12). If the probe address is less than twelve (12) and therefore not a line pressure probe 30, program flow is routed to label C in FIG. 2. If the probe address is greater than or equal to twelve (12) and therefore a line pressure probe 30, the controller 14 delays 0.6 seconds then the controller 14 retrieves the first part of the line pressure probe 30 signature. The controller 14 compares the first part of the line pressure probe 30 signature with the value set for "OIL", and if the values are equal the first part is correct. If the first part of the line pressure probe 30 address is different from the value set for "OIL", program flow is diverted to label C, FIG. 2 where another 0.6 second delay occurs, and the second and final half of the line pressure probe 30 signature retrieved. The second half of the line pressure probe 30 signature is then compared with the value set for "DRY" to determine if the signature is correct. If the second half of the line pressure probe 30 signature equals the value set for "DRY," the signature is correct. If the second half of the line pressure probe 30 signature is not equal to "DRY," program flow is again diverted to label C in FIG. 2.

When the controller 14 recognizes a proper line pressure probe 30 signature, the controller 14 delays for 0.6 seconds and reads line pressure probe 30 status. The line pressure probe 30 status is then compared to the value set for "OIL" and "DRY." If the line pressure probe 30 status is equal to the values set for "OIL" and "DRY," then the line pressure probe 30 signal will be converted to "WET." If the line pressure probe 30 status is not equal to "OIL" and "DRY," then no data conversion is required and program flow is diverted to label D in FIG. 2.

Discussion of the Process RS232 Routing referring to FIG. 5. The message capability of the RS232 has been increased to add "PASS" and "TEST" to the RS232 vocabulary. "PASS" indicates the line pressure probe 30 has determined the product line 26 has passed the line tightness test. "TEST" indicates the controller 14 has not yet completed a line tightness test.

If the controller 14 is not reading a line pressure probe 30 address, then normal data is sent to the RS232 port. If the controller 14 is reading a line pressure probe 30 address, the line pressure probe 30 status is read. If line pressure probe 30 status equal "DRY", the message pointer for the look-up table is set to "PASS." If the line pressure probe 30 status is not equal to "DRY," then the line pressure probe 30 is tested to determine if the line pressure probe 30 status is "ZERO" or "NO STATUS."

If line pressure probe 30 status is "ZERO", the message pointer is set to "TEST", and program flow continues to send the look-up table data out to the RS232 port. If the line pressure probe 30 status is "NO STATUS" then "TEST" is reported to indicate that the line pressure probe 30 test has not yet been completed. Upon completion of transmission of data to the RS232 port, the controller 14 is reinitialized and code execution begin at label A, FIG. 3.

Figure 6:
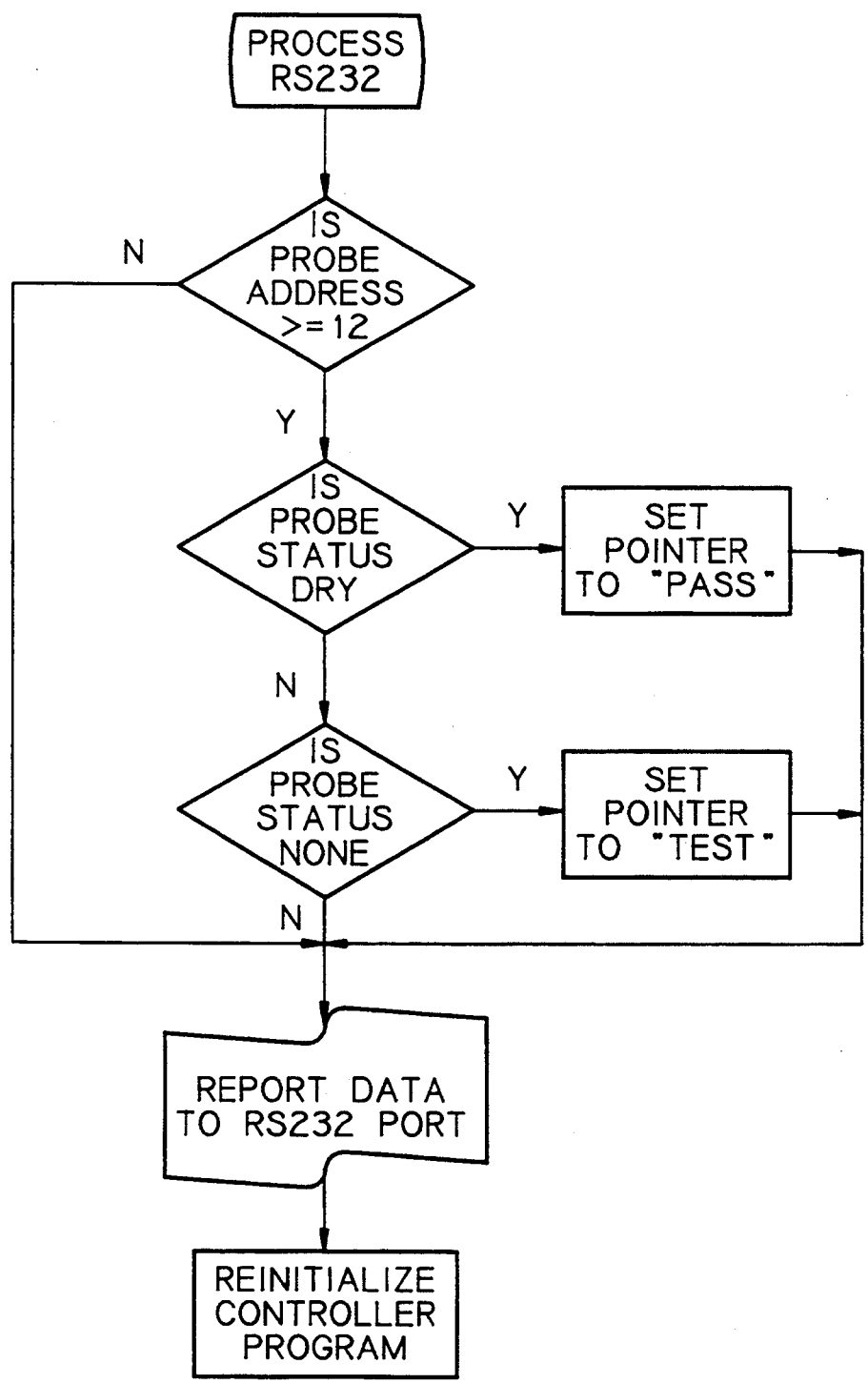
FIG. 6 shows a flowchart for RS232 communications reporting improvements; and,
FIG. 7 shows an example of various probe conditions, controller display and RS232 reports.

Examples of the software improvement operation. Referring to FIG. 6, this table illustrates possible responses based upon probe data from a line pressure probe 30 (FIG. 1). These responses shown can be produced by any probe with an address greater than or equal to twelve (12). For instance all probes, 12-15, could have the same probe data and therefore the same report and the same test status. Probe 15 is repeated twice to show a fifth type of probe data. In an installed leak detection system 10 (FIG. 1), there could only be one probe number 15. When the controller 14 displays "Oil", (as shown for probe no. 13) there is also displayed a flashing "Leak" and an audible alarm sounds. When the controller 14 displays "Wet", (as shown for probe no. 14) there is also displayed a flashing "Alert" and an audible alarm sounds.

The following portion of the disclosure of this patent document contains material subject to copyright protection. The copyright owner has no objection to the facsimile reproduction by anyone of the patent document or the patent disclosure, as it appears in the Patent and Trademark Office patent Files or records, but otherwise reserves all copyright rights whatsoever.

Probe Signature and Error Detection Source Code, (c) 1991 Emerson Electric Co. written in assembly language for Motorola microprocessor part no. MC68HC705C8:

| LABEL | OP CODE | OPERATOR | COMMENTS |
|---|---|---|---|
| EC1 | LDA | PROBAD | |
| | CMP | #$0C | ARE AT PROBE 12 OR HIGHER |

-continued

| LABEL | OP CODE | OPERATOR | COMMENTS |
|---|---|---|---|
| | BHS | EC21 | YES DO SPECIAL HANDLING |
| | BRA | EC3B | NO SKIP SPECIAL HANDLING |
| EC21 | LDA | STAT1,X | GET PROBE STATUS |
| | AND | #$E0 | STRIP OFF PROBE STATUS |
| | CMP | #$20 | CHECK FOR OIL SIGNAL DID WE GET IT |
| | BEQ | EC3A | YES CONTINUE ON |
| | BRA | EC2 | NO GO SET ERROR BIT |
| EC3A | LDA | #$06 | YES WAIT 5 SEC AND CHECK THEM |
| | STA | TDLY | SET UP DELAY |
| DLY2 | LDA | TDLY | |
| | BNE | DLY2 | LOOP FOR 0.5 SECONDS |
| | LDA | PORT1A | GET PROBE DATA |
| | AND | #$E0 | STRIP OFF JUNK |
| | CMP | #$A0 | SEE IF BOTH OIL AND DRY |
| | BNE | NOT_WET | |
| | LDA | #$40 | CONVERT IT TO WET |
| NOT_WET | STA | STAT1,X | STORE NEW PROBE DATA |
| | LDA | PORTA | |
| | AND | #$1F | |
| | STA | PORTA | UPDATE DISPLAY WITH NEW STATUS |
| | LDA | STAT1,X | STORE IT IN THE PROBE STATUS |
| | ORA | PORTA | PREPARE TO SEND IT TO THE DISPLAY |
| | STA | PORTA | SEND IT |
| | LDA | PORT1B | AFTER WE ARE DON'T LOOKING AT THE PROBE SEND |
| | AND | #$F0 | OUT ADDRESS 0 SO THERE IS ONLY ONE LINE |
| | STA | PORT1B | PRESSURE PROBE IT WILL NOT ERROR |
| | LDA | STAT1,X | |

RS-232 Communications Improvements Source Code, (c) 1991 Emerson Electric Co. written in assembly language for Motorola microprocessor part no. MC68HC705C8:

| LABEL | OP CODE | OPERATOR | COMMENTS |
|---|---|---|---|
| TEST | FCB | $54,$45, $53,$54, $20,$08 | RS-232 DATA TABLE |
| PASS | FCB | $50,$41, $53,$53, $20,$08 | TABLE |
| LINPRES | LDA | STAT1,X | GET PROBE STATUS |
| | BIT | #$04 | TEST ERROR BIT |
| | BNE | LPLER | IF ERROR BET IS SET SEND OUT ERROR |
| | BIT | #$20 | IF OIL NOT CLEAR DO PREC FAIL |
| | BNE | LPLEAK | |
| | BIT | #$40 | CHECK WET BIT IF NOT CLEAR DO PREC FAIL |
| | BNE | PRFAIL | WE HAVE FAILED THE PREC TEST |
| | BIT | #$80 | CHECK DRY BIT IF NOT CLEAR DO PREC TEST |

-continued

| LABEL | OP CODE | OPERATOR | COMMENTS |
|---|---|---|---|
| | BNE | PPASS | WE PASSED THE Line tightness test |
| | JMP | LPTEST | |

The previously described versions of the present invention have many advantages, including: providing a low-cost method of modifying previously installed leak detection systems to perform the E.P.A. required line tightness test.

Although the present invention has been described in considerable detail with reference to certain preferred versions thereof, other versions are possible. Therefore, the spirit and scope of the appended claims should not be limited to the description of the preferred versions contained herein.

What is claimed is:

1. A fluid leak detection system for use in a hydrocarbon storage and dispensing system, comprising:
   (a) at least one line pressure probe physically connected to a hydrocarbon product line that conducts a line tightness test by measuring pressure versus time to determine if the hydrocarbon product line is leaking and then generates:
      (1) a first signal to indicate a line tightness test has been failed and the product line is therefore leaking,
      (2) a second signal to indicate that a line tightness test has been successfully completed and therefore the product line is not leaking, and,
      (3) a third signal to indicate that a line tightness test has not been completed during a predetermined period of time and therefore actions should be taken to permit the line pressure probe to perform a line tightness test;
   (b) a programmable controller that is electrically connected to the line pressure probe, comprising:
      (1) means for receiving signals electrically connected to one or more line pressure probes,
      (2) means for identifying the location of each line pressure probe connected to the means for receiving signals to associate each line pressure probe location with each line pressure probe's respective signals,
      (3) means for comparing signals connected to the means for identifying each line pressure probe to compare the first signal, the second signal, and the third signal against stored decision criteria to produce a result, and
      (4) means for reporting the result connected to the means for comparing signals to annunciate when the product line is leaking, when a line tightness test has been successfully passed, and when a line tightness test has not been completed during a predetermined period of time.

2. The programmable fluid detector as recited in claim 1 wherein the line pressure probe, further comprises:
   (a) a forth signal to indicate the line pressure probe or connection between the line pressure probe and the programmable controller is defective, and,
   (b) a fifth signal to indicate a gross or catastrophic leak test has been failed.

3. The fluid leak detection system as recited in claim 1 wherein the line tightness test determines whether a product line is leaking at a rate of 0.2 gallons (0.23 liters) per hour.

* * * * *